(12) United States Patent
Ye et al.

(10) Patent No.: US 7,746,381 B1
(45) Date of Patent: Jun. 29, 2010

(54) MULTI-DISPLAY DIGITAL PHOTO FRAME

(75) Inventors: Jia-Yong Ye, Shenzhen (CN); Gao-Hui Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/432,710

(22) Filed: Apr. 29, 2009

(30) Foreign Application Priority Data

Jan. 5, 2009 (CN) .......................... 2009 2 0300041

(51) Int. Cl.
*H04N 5/225* (2006.01)
(52) U.S. Cl. .................................. 348/207.99
(58) Field of Classification Search ............ 348/207.99; 345/55
See application file for complete search history.

(56) References Cited

U.S. PATENT DOCUMENTS

| | | | |
|---|---|---|---|
| 6,266,069 B1 * | 7/2001 | Thagard et al. | 345/638 |
| 7,107,605 B2 * | 9/2006 | Janik | 725/51 |
| 7,203,380 B2 * | 4/2007 | Chiu et al. | 382/284 |
| 2004/0257348 A1 * | 12/2004 | Ou | 345/204 |
| 2007/0291153 A1 * | 12/2007 | Araki et al. | 348/333.05 |
| 2008/0007481 A1 * | 1/2008 | Chen et al. | 345/1.1 |
| 2009/0009530 A1 * | 1/2009 | Araki et al. | 345/619 |
| 2009/0231233 A1 * | 9/2009 | Liberatore | 345/1.3 |
| 2009/0256780 A1 * | 10/2009 | Small et al. | 345/55 |

* cited by examiner

*Primary Examiner*—James M Hannett
(74) *Attorney, Agent, or Firm*—Zhigang Ma

(57) ABSTRACT

A multi-display digital photo frame is provided. The multi-display digital photo frame includes a front cover, a rear cover, and a body. The front cover includes at least two apertures, the body includes at least two holding components for placing LCDs, the bottom of each holding component mounted a LCD further for mounting a processor, wherein the processor is connected to the corresponding LCD through a bus.

4 Claims, 2 Drawing Sheets

MULTI-DISPLAY DIGITAL PHOTO FRAME

BACKGROUND

1. Technical Field

The present disclosure relates to a multi-display digital photo frame.

2. Description of Related Art

Digital photo frames are intended to conveniently display images without the need to print the images out. Displaying images is an essential function of digital photo frames, therefore, various manners for displaying images will be an important element for attracting customers. However, many digital photo frames have only a single LCD, accordingly, forms of displaying images with a single LCD are restricted. Therefore, what is needed is a digital photo frame with multiple displays, which can overcome the aforementioned shortcomings.

BRIEF DESCRIPTION OF THE DRAWINGS

The components of the drawings are not necessarily drawn to scale, the emphasis instead being placed upon clearly illustrating the principles of a multi-display digital photo frame. Moreover, in the drawings, like reference numerals designate corresponding parts throughout several views.

DETAILED DESCRIPTION

Figure 1:
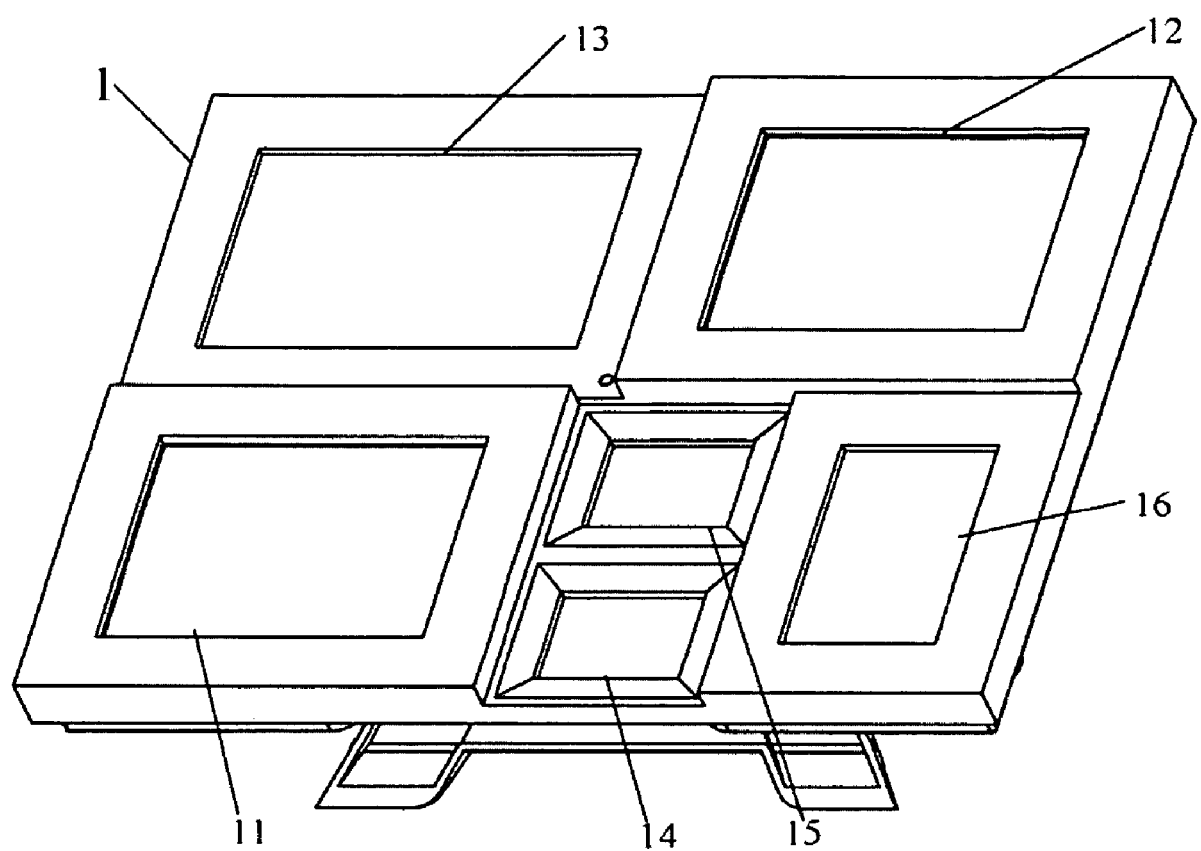
FIG. 1 is a perspective view of a multi-display digital photo frame in accordance with an exemplary embodiment.
Figure 2:
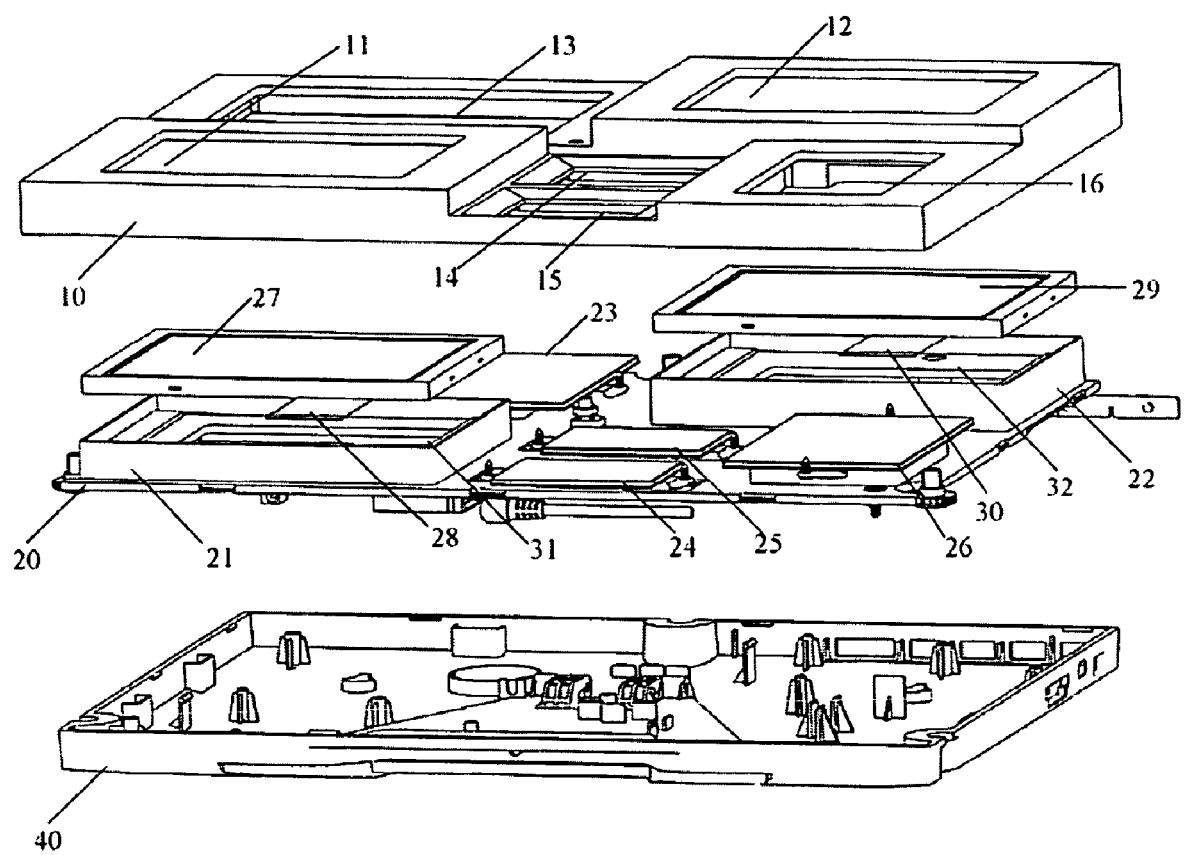
FIG. 2 is an exploded perspective view of a multi-display digital photo frame according to an exemplary embodiment.

Referring FIGS. 1-2, a multi-display digital photo frame 1 in accordance with an exemplary embodiment is provided. The multi-display digital photo frame 1 includes a front cover 10, a body 20, and a rear cover 40 having a bracket for supporting the multi-display photo frame 1. The front cover 10, the body 20, and the cover 40 are connected together through bolts (not shown).

The front cover 10 defines several apertures 11-16 thereof. The shape of the apertures 11-16 can be rectangular, circular, and so on. For example, in the embodiment as shown in FIG. 1, the apertures 11-16 are rectangular.

The body 20 includes several holding components 21-26. The number of the holding components 21-26 is equal to the number of the apertures 11-16, and the holding components 21-26 are substantially the same shape as the apertures 11-16, by this arrangement, the front cover 10 and the body 20 can be fastened together. In addition, at least two of the holding components 11-16 are configured for mounting LCDs (Liquid Crystal Display), and a processor is provided for each LCD. For illustrative purpose, hereinafter, two holding components 21 and 22 configured for mounting LCDs are taken as an example. The holding component 21 mounts a LCD 27, and the bottom of the holding component 21 further mounts a first processor 31, and the LCD 27 is connected to the first processor 31 through a bus 28. The holding component 22 mounts a LCD 29, and the bottom of the holding component 22 further mounts a second processor 32, and the LCD 29 is connected to the second processor 32 through another bus 30. One of the processors (e.g., the first processor 31) is regarded as a master processor, and the other of the processors (e.g., the second processor 32) is regarded as a slave processor. The master processor 31 is connected to a power source, an input unit, an interface, and so on, and is further connected to the slave processor 32 through a bus, e.g., a USB bus.

The other holding components 23-26 are configured for holding printed photos and having a transparent material to cover and protect the photos.

Although the present embodiments have been specifically described as examples, the disclosure is not to be construed as being limited thereto. Various changes or modifications may be made to the embodiment without departing from the scope and spirit of the invention.

What is claimed is:

1. A multi-display digital photo frame comprising:
   a front cover comprising at least two apertures;
   a rear cover; and
   a body comprising at least two holding components, wherein each of the holding components is configured for mounting an LCD exposed via one of the at least two apertures, the front cover and the body being mounted to the rear cover, and each holding component is further for mounting a processor, and the processor is connected to the corresponding LCD through a bus.

2. The multi-display digital photo frame as described in claim 1, wherein the number of the holding components is equal to the number of the apertures, and the holding components are substantially the same the shape as the corresponding apertures.

3. The multi-display digital photo frame as described in claim 1, wherein one of the processors is connected to an input unit, an interface, and a power source, and is further connected to other processors through the bus.

4. The multi-display digital photo frame as described in claim 1, further comprising other holding components for holding printed photos thereon.

* * * * *